US012306827B2

(12) United States Patent
Guggulla

(10) Patent No.: US 12,306,827 B2
(45) Date of Patent: *May 20, 2025

(54) MANAGING MULTIPLE TYPES OF DATABASES USING A SINGLE USER INTERFACE (UI) THAT INCLUDES VOICE RECOGNITION AND ARTIFICIAL INTELLIGENCE (AI)

(71) Applicant: VJ Solutions LLC, Round Rock, TX (US)

(72) Inventor: Veda Kumari Guggulla, Round Rock, TX (US)

(73) Assignee: VJ Solutions LLC, Round Rock, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/105,426

(22) Filed: Feb. 3, 2023

(65) Prior Publication Data

US 2023/0409567 A1    Dec. 21, 2023

Related U.S. Application Data

(63) Continuation-in-part of application No. 17/840,720, filed on Jun. 15, 2022, now Pat. No. 11,829,335.

(51) Int. Cl.
| | |
|---|---|
| *G06F 16/242* | (2019.01) |
| *G06F 3/16* | (2006.01) |
| *G06F 8/61* | (2018.01) |
| *G06F 9/445* | (2018.01) |
| *G06F 9/54* | (2006.01) |
| *G06F 16/21* | (2019.01) |

(Continued)

(52) U.S. Cl.
CPC ............ *G06F 16/243* (2019.01); *G06F 3/167* (2013.01); *G06F 8/61* (2013.01); *G06F 9/44526* (2013.01); *G06F 9/541* (2013.01); *G06F 16/21* (2019.01); *G06F 16/23* (2019.01); *G06F 16/2455* (2019.01); *G06F 16/24556* (2019.01); *G06F 16/248* (2019.01); *G06F 21/44* (2013.01)

(58) Field of Classification Search
USPC ................................................. 704/9, 1–504
See application file for complete search history.

(56) References Cited

U.S. PATENT DOCUMENTS

| | | | |
|---|---|---|---|
| 11,036,696 B2 * | 6/2021 | Higginson | ............ G06F 9/5061 |
| 11,269,426 B2 * | 3/2022 | Jorasch | ................... A63F 13/79 |

(Continued)

*Primary Examiner* — Marcus T Riley
(74) *Attorney, Agent, or Firm* — Shiv S. Naimpally; Flagship Patents

(57) ABSTRACT

In some aspects, a software application receives input including at least a portion of a command and determines, using an artificial intelligence algorithm and based on the input and historical data, predicted commands. The software application receives a selection of one of the predicted commands, determines databases affected by the selected commands, determines database vendors associated with each affected database, converts the selected commands into database specific commands, and sends the database specific commands to the affected databases for execution. For example, the software application may send first database specific commands to a first database associated with a first database vendor and may send second database specific commands to a second database associated with a second database vendor.

20 Claims, 7 Drawing Sheets

(51) Int. Cl.
*G06F 16/23* (2019.01)
*G06F 16/2455* (2019.01)
*G06F 16/248* (2019.01)
*G06F 21/44* (2013.01)

(56) References Cited

U.S. PATENT DOCUMENTS

| | | | |
|---|---|---|---|
| 11,385,726 B2* | 7/2022 | Jorasch | H04L 12/1822 |
| 11,567,586 B2* | 1/2023 | Jorasch | A63F 13/71 |
| 11,797,102 B2* | 10/2023 | Jorasch | A63F 13/428 |
| 12,147,612 B2* | 11/2024 | Jorasch | A63F 13/213 |
| 2017/0351716 A1* | 12/2017 | Higginson | G06F 16/285 |
| 2021/0373676 A1* | 12/2021 | Jorasch | A63F 13/213 |
| 2021/0406708 A1* | 12/2021 | Renckert | G06N 5/04 |
| 2022/0011878 A1* | 1/2022 | Jorasch | A63F 13/26 |
| 2022/0300093 A1* | 9/2022 | Jorasch | A63F 13/26 |
| 2023/0152906 A1* | 5/2023 | Jorasch | G06F 3/0325 |
| | | | 345/156 |
| 2023/0409567 A1* | 12/2023 | Guggulla | G06F 16/248 |
| 2024/0004481 A1* | 1/2024 | Jorasch | G06F 3/038 |

* cited by examiner

MANAGING MULTIPLE TYPES OF DATABASES USING A SINGLE USER INTERFACE (UI) THAT INCLUDES VOICE RECOGNITION AND ARTIFICIAL INTELLIGENCE (AI)

CROSS-REFERENCE TO RELATED APPLICATIONS

The present patent application is a continuation-in-part of U.S. patent application Ser. No. 17/840,720, filed on Jun. 15, 2022, entitled "USING MACHINE LEARNING TO PROVIDE A SINGLE USER INTERFACE FOR STREAMLINED DEPLOYMENT AND MANAGEMENT OF MULTIPLE TYPES OF DATABASES" and is incorporated by reference herein in its entirety and for all purposes as if completely and fully set forth herein.

BACKGROUND OF THE INVENTION

Field of the Invention

This invention relates to a database management software that provides a user interface (UI) to manage multiple types of databases (e.g., from multiple database providers) and includes voice recognition and artificial intelligence.

Description of the Related Art

Currently, each type of database has a corresponding management system (with its own unique user interface (UI)), with each management system being different from other management systems. This results in a database analyst having to learn multiple management systems in a heterogenous database environment. For example, in a company (e.g., Enterprise) that grows through acquiring other companies, the company may have multiple databases from multiple database providers (e.g., Oracle®, MongoDB®, Cassandra®, and the like). To manage the multiple types of databases, a database administrator may open a first database management system to manage a first database from a first database provider, open a second database management system to manage a second database management system from a second database provider, and so on. Thus, managing multiple types of databases in a heterogenous database environment involves using multiple database management systems, each with their own UI. This results in various issues, such as the inability to view the status of all databases in a single user interface (UI) window, having to send database-specific commands to each type of database and then merging the results, and the like. For example, performing a human resource (HR) related task (e.g., payroll) may involve sending a first type of command to a first type of database (e.g., Oracle® command to Oracle® databases), a second type of command to a second type of database (e.g., MongoDB® command to MongoDB® databases), and so on and then merging the results. Such a cumbersome process results in much longer times to obtain results.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a software application receives input including at least a portion of a command and determines, using an artificial intelligence algorithm and based on the input and historical data, predicted commands. The software application receives a selection of one of the predicted commands, determines databases affected by the selected commands, determines database vendors associated with each affected database, converts the selected commands into database specific commands, and sends the database specific commands to the affected databases for execution. For example, the software application may send first database specific commands to a first database associated with a first database vendor and may send second database specific commands to a second database associated with a second database vendor.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
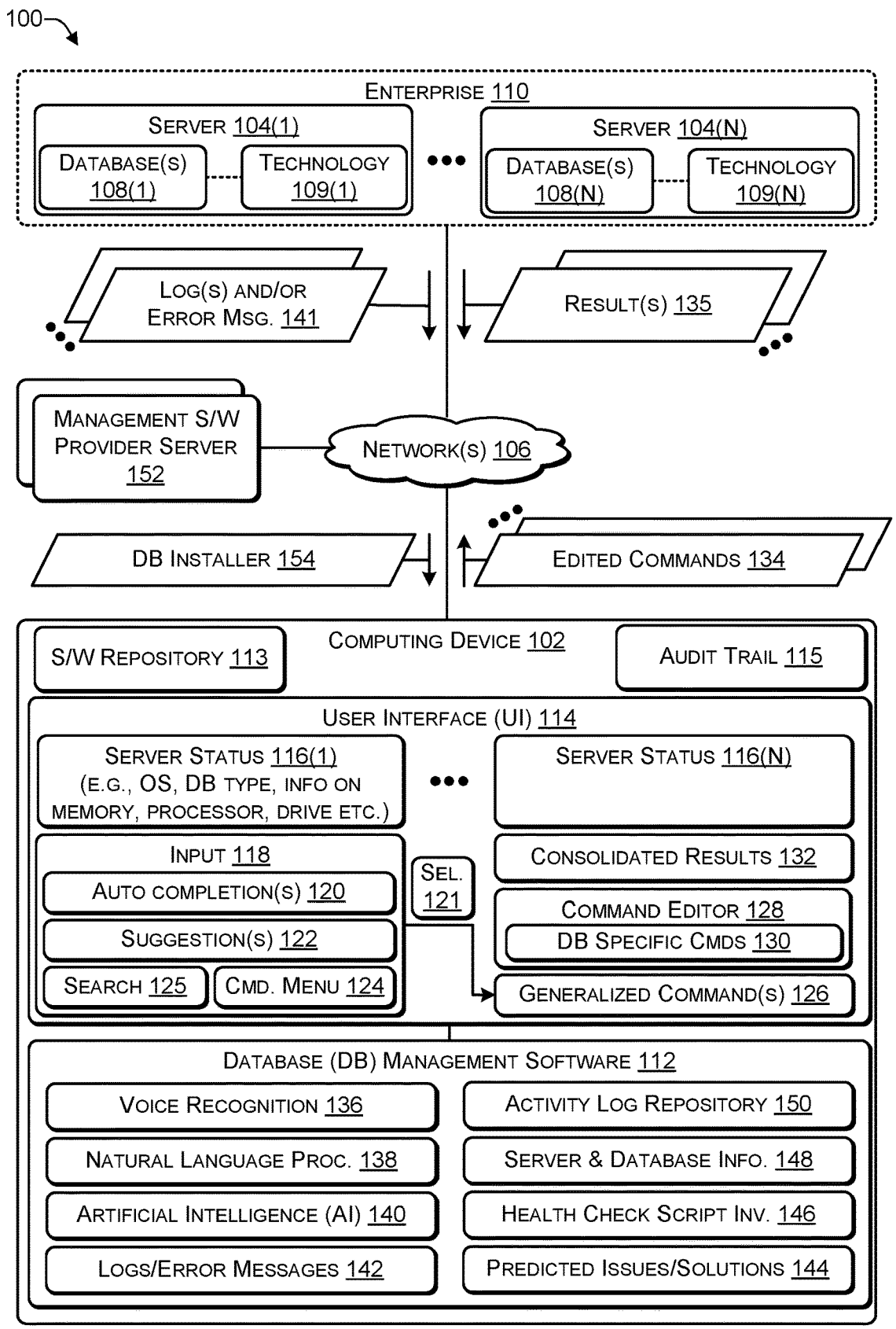
FIG. 1 is a block diagram of a system that includes a user interface (UI) to manage databases from multiple database providers, according to some embodiments.

The systems and techniques described herein provide a single tool, e.g., database management software, to manage multiple databases in a heterogenous database system. A heterogenous database system is a system of multiple databases in which at least a first database is provided by a first database vendor and is a first type of database and a second database is provided by a second database vendor and is a second type of database. For example, the types of databases may include MongoDB®, Percona®, PostgreSQL®, Neo4j®, Cassandra®, Elasticsearch®, Oracle®, MySQL®, MariaDB®, MSSQL®, or the like. Each type of database may use a database technology that is unique to each particular database. The database management software provides a user interface (UI) that enables multiple types of databases in a heterogenous database environment to be managed as if they were the same type of database. In contrast, in a conventional system that includes multiple types of databases, the system administrator uses a database-specific management software for each type of database, e.g., a first management software for a first type of database, a second management software for a second type of database, and so on. In addition, the database management software described herein enables a user to perform commands (query, modify, and the like) to multiple databases using plain English commands, e.g., without knowing the specific database language associated with each type of database, because the database management software is able to convert the plain English commands into database-specific commands. For example, assume that two or more companies have merged or one company has acquired one or more other companies and that each company uses a different type of database to store data, including human resources (HR) data. The database management software described herein can receive input, such as "create a list of all employees sorted by department and within each department, sorted by salary", determine which databases store this information, identify the types of databases, translate the input into database-specific commands to send to each database that includes relevant information, send the database-specific commands to each of the appropriate databases (e.g., send a first set of commands to a first database that was associated with a first company, second a second set of commands to a second database that was associated with a second company, and so on), receive database-specific results (e.g., each type of database may provide data in a format and style that is specific to that type of database and is different from other databases), standardize the database-specific results to create standardized results (e.g., results in a standardized format), and merge the results to create a single file that includes the requested information in a uniform format and style. In contrast, in a conventional system, an expert in Oracle® database language may send Oracle® commands to an Oracle® database, an expert in Mongo DB® language may send Mongo® commands to a Mongo DB® database, and so on because a particular database administrator (DBA) may not be an expert in all of the types of databases present in a heterogenous database environment. The database management software described herein works with multiple types of operating systems (OS), such as Windows®, Linux®, RedHat®, Ubuntu®, and the like.

A user can thus make perform commands (e.g., retrieve, modify, and the like) to data stored in multiple types of databases without learning database-specific commands. For example, the user can use general commands (e.g., plain English). The database management software determines which databases store the data that is associated with the commands and translates the general commands to database-specific commands. The database management software also provides help using the AI. For example, the user can ask "How do I find all X sorted in descending order?" and the AI will translate the English commands into database-specific commands to obtain the intended information.

The database management software described herein includes artificial intelligence (AI) to perform various functions, including auto-completion of commands. For example, the user may begin providing input (e.g., part of a command) and the AI may predict what command the user intends to type and provide one or more predicted commands in a drop-down menu from which the user can select to complete the command(s) and provide input. The AI may predict follow-up commands to previous input. For example, the AI may predict that <command 1> is often (greater than a threshold percentage) followed by <command 2>. In this example, after providing <command 1> as input, the AI may suggest performing <command 2>. As another example, the AI may predict that <command 1> is often followed by either <command 2> or <command 3>. After providing <command 1> as input, the AI may suggest performing either <command 2> or <command 3>.

The AI may automatically perform a health check for each database and display the results of the health check in the UI. For example, the AI may analyze error messages and logs that occur within a particular time period and predict issues and provide suggested solutions. For example, the AI may analyze, at a user-specified time (e.g., 4:00 AM), the error messages and logs within the previous 24-hour time period (e.g., from 4:00 AM of the previous day to 3:59 AM of the current day) and identify predicted issues (e.g., low disk space, malfunctioning drive, configuration issue, or the like) and suggested solutions (e.g., add an additional disk drive to increase disk space, replace the malfunctioning drive, reconfigure particular parameters of the operating system (OS) or database, or the like). In addition, the AI may analyze error messages and logs "on demand". For example, if the user suspects the system may have an issue (e.g., the user observes that system is behaving unusually), then the user may instruct the AI to perform an analysis of the error messages and logs. The user may specify a time period, e.g., 4 hours, 6 hours, 12 hours, 24 hours, 1 week, 1 month or the like and the AI may analyze the error messages and logs generated during the specified time period. The UI may display the status of each database and enable a user to adjust the granularity of the data to zoom in and zoom out of the multiple databases in the system. The status of each database is presented in a uniform format and style, regardless of the type of database. In this way, a user is able to have an end-to-end view of the multiple databases in the system.

The database management software described herein may receive input from multiple input devices, including, for example, a keyboard, a mouse (or similar, such as a trackball), a touchscreen, a microphone to receive voice input, or the like. For example, the database management software may use voice recognition and natural language processing (NLP) to process input received from a microphone to display one or more commands that the user can edit prior to sending.

The database management software includes a change tracking mechanism (e.g., audit trail) to track changes made to each database. Open-source databases, such as MongoDB, lack any type of audit trail or change tracking mechanism. The change tracking mechanism maintains a record of all changes made to each database, including when (e.g., date and time) the change was made, a username of a user that made the change, a privilege level associated with the username, what change (e.g., read, write, delete, modify, or the like) was made, and so on. An administrator may specify additional information that the database management software gathers for each change made to each database. In this way, the database management software provides centralized governance and tracking.

A website of the database management software provider may include installation files for each type of database. For example, if a user desires to install Oracle® on a server, the user downloads an Oracle® installer from the website of the software provider and then runs the installer. After the user initiates execution of the installer, the user logs in to the database management software and the installer installs the database on a particular server. The database management software automatically obtains information about the server (e.g., memory information, storage information, processor information, operating system type, operating system version, and the like) and about the database (e.g., type of database, database version, database configuration). If there are servers that had databases installed on them before the database management software was installed, then the server information and database information may be automatically obtained by the database management software using a discovery process. For any servers and/or databases that the database management software is unable to obtain, the user may be asked to manually enter the information. The UI may display a list of servers and the databases hosted by each server, including servers for which the information has been automatically obtained and servers for which the information was manually entered. Thus, each time a database is installed, the database management software automatically obtains information about the server and the database and stores it to enable the UI to display an end-to-end view of the servers and databases in the system.

The website of the database management software provider may include (1) a global inventory of commands, macros, scripts and the like that is available to download by any customer of the database management software provider and (2) a custom inventory of commands, macros, scripts and the like that is available to download only by the customer that initially uploaded them. In this way, a particular customer can share commands, macros, scripts and the like with other customers by placing the commands, macros, scripts, and the like in the global inventory. A particular customer can store commands, macros, scripts and the like to enable their employees to refine and evolve the commands, macros, scripts and the like over time.

The UI may provide a drop-down menu of commonly performed commands (e.g., "list directory"). When a user provides a selection from the drop-down menu, the selection is translated into database-specific command(s) (e.g., "list directory is translated to "ls-ltr") and displayed. Power users, e.g., users who are familiar with the database-specific language, can edit the displayed database-specific command(s) prior to selecting "send" to send the edited command(s) to the appropriate database(s). Non-technical users may typically select from the drop-down menu, view the database-specific command(s) and select "send". The database management software receives the results from the databases to which the command(s) were sent, formats the individual results into a standard format and style to create standardized results, merges the standardized results to create a merged result, and displays via the UI, the merged result. The UI provides a search function to enable a user to search the commonly performed commands in the drop-down menu. The UI enables a user to save a particular set of (one or more) commands that the user frequently executes.

Some of the advantages of the database software management software described herein include reducing the capex/opex in terms of the time to learn the syntax to query each type of database is reduced, easy installation and maintenance, and a single UI to manage and query databases in a heterogeneous database environment.

As a first example, a computing device includes one or more processors and one or more non-transitory computer-readable storage media to store instructions executable by the one or more processors to perform various operations. The operations include receiving, via a user interface of a software application, input including at least a portion of a set of commands. For example, the input may include voice input received from a microphone connected to the computing device and the operations may include performing voice recognition and natural language processing to the voice input to determine the portion of the set of commands. The operations include determining, using an artificial intelligence algorithm and based on the input and based on historical data that includes previously input commands, one or more predicted sets of commands. The operations include receiving, via the user interface, a user selection of a set of predicted commands from the one or more predicted sets of commands to create a user selected set of commands. The operations include determining, by the software application, a plurality of databases affected by the user selected set of commands. The operations include determining, by the software application, a plurality of database vendors (e.g., MongoDB®, Percona®, PostgreSQL®, Neo4j®, Cassandra®, Elasticsearch®, Oracle®, MySQL®, MariaDB®, MSSQL®, or the like) associated with each database of the plurality of databases. The operations include converting the user selected set of commands into a plurality of database specific commands comprising at least first database specific commands and second database specific commands. The operations may include receiving, from a command editor of the user interface, one or more edits to at least one command of the plurality of database specific commands. The operations include sending the first database specific commands to a first database of the plurality of databases, wherein the first database and the first database specific commands are associated with a first database vendor of the plurality of database vendors. and sending the second database specific commands to a second database of the plurality of databases, wherein the second database and the second database specific commands are associated with a second database vendor that is different from the first database vendor of the plurality of database vendors. The plurality of database specific commands may include third database specific commands and the operations may include sending the third database specific commands to a third database of the plurality of databases, where the third database and the third database specific commands are associated with a third database vendor that is different from both the first database vendor and the second database vendor. The operations may include receiving first results from a first server hosting the first database after performing the first database specific commands to the first database, converting the first results into first standardized results, receiving second results from a second server hosting the second database after performing the second database specific commands to the second database, converting the second results into second standardized results, merging the first standardized results and the second standardized results to create consolidated results, and displaying the consolidated results using the user interface of the software application.

As a second example, a memory device may be used to store instructions executable by one or more processors to perform various operations. The operations include receiving, via a user interface of a software application, input including at least a portion of a set of commands. The operations include determining, using an artificial intelligence algorithm and based on the input and based on historical data that includes previously input commands, one or more predicted sets of commands. The operations include receiving, via the user interface, a user selection of a set of predicted commands from the one or more predicted sets of commands to create a user selected set of commands. The operations include determining, by the software application, a plurality of databases affected by the user selected set of commands. The operations include determining, by the software application, a plurality of database vendors associated with the plurality of databases. The operations include converting the user selected set of commands into a plurality of database specific commands comprising at least first database specific commands and second database specific commands. The operations include sending the first database specific commands to a first database of the plurality of databases, where the first database and the first database specific commands are associated with a first database vendor of the plurality of database vendors. The operations include sending the second database specific commands to a second database of the plurality of databases, where the second database and the second database specific commands are associated with a second database vendor that is different from the first database vendor. The operations may include determining that a trigger condition occurred. The operations may include initiating a health check based on determining that the trigger condition occurred. The operations may include displaying, via the user interface, a result of performing the health check. The result includes a status of at least one database of the plurality of databases. Determining that the trigger condition has occurred may include either (1) determining that a current time comprises a predetermined time or (2) determining that a request to perform the health check was received from the user interface. The health check may include determining one or more logs that occurred within a specified time period, determining one or more error messages that occurred within the specified time period, performing, using a second artificial intelligence algorithm, an analysis of the one or more logs and the one or more error messages, predicting, based on the analysis, one or more issues associated with at least one database of the plurality of databases, determining, using the second artificial intelligence algorithm and based at least in part on the analysis, one or more solutions to address at least one issue of the one or more issues, ranking the one or more solutions based at least in part on a predicted probability that each solution of the one or more solutions addresses the at least one issue to create ranked solutions, and displaying, via the user interface, at least a threshold number of the ranked solutions. The operations may include receiving, via the user interface, a user selection of a particular solution of the ranked solutions and scheduling one or more actions to perform to at least one database of the plurality of databases based at least in part on the user selection of the particular solution. The operations may include determining a timestamp indicating a time associated with sending the first database specific commands to the first database, determining a username associated with a user providing the input, creating an activity log comprising the timestamp, the username, and the first database specific commands, and storing the activity log in an activity log repository. After performing the first database specific commands to the first database the operations may include receiving a first log from the first database and storing the first log in the memory device. The first log may indicate a status of performing the first database specific commands to the first database.

FIG. 1 is a block diagram of a system 100 that includes a user interface (UI) to manage databases from multiple database providers, according to some embodiments. The system 100 includes a representative computing device 102 that is connected to multiple servers 104(1) to 104(N) via one or more networks 106. Each server 104 includes one or more databases 108, with individual databases 108 having an associated technology 109. For example, the server 104(1) includes one or more databases 108(1) and the server 104(N) includes one or more databases 108(N). The servers 104 are associated with an enterprise 110 (e.g., a company).

Of course, more than one computing device may be connected to the enterprise 110. A single representative computing device 102 is shown for ease of illustration. The representative computing device 102 may be a device used by user, such as a system administrator, to issue commands (e.g., read, write, delete, modify or the like) to one or more of the databases 108. At least two of the databases 108 may have different technologies 109. For example, the database 108(1) may use a particular database technology (e.g., MongoDB®) while the database 108(N) may use a different database technology (e.g., Oracle®). The database technologies may include, for example, MongoDB®, Percona®, PostgreSQL®, Neo4j®, Cassandra®, Elasticsearch®, Oracle®, MySQL®, MariaDB®, MSSQL®, and the like.

Database management software 112 may be downloaded from a management software provider server 152 and installed on the computing device 102. The database management software 112 may provide a user interface (UI) 114. A user, such as a system administrator, may use the UI 114 to provide input (e.g., commands), send the input to one or more of the databases 108, and view consolidated results 132 that include the results of performing the commands to one or more of the databases 108.

The UI 114 may display server status 116(1) to 116(N) corresponding to the servers 104(1) to 104(N), respectively. For example, the server status 116 may include identifying: an operating system (OS) installed on each server 108, a database type of the databases 108 installed on each server 104, memory information (e.g., how much memory is installed, memory usage statistics, available slots, and the like) for the memory installed on each server 104, processor information (e.g., type of processor, number of cores, clock speed, processor utilization, and the like) for the processor(s) installed on each server 104, drive information (e.g., number of mechanical drives, number of solid state drives (SSD), drive utilization information including amount of space used and amount of space available on each drive, and the like) for the drive(s) installed on each server 104, configuration information, manufacturer and model number, and other information associated with each server 104. The information displayed in each server status 116 may be user configurable to enable a user to configure the UI 114 to display information in the server status 116 about each server 104 that is relevant to the user and not display information that is not relevant to the user. The UI 114 may be configured to display information in a user-selectable human language, including, for example, English, French, Spanish, German, Hindi, or another language used by humans to communicate.

The database management software 112 includes a voice recognition module 136 to enable the user to provide voice input via a microphone connected to the computing device 102. The voice recognition module 136 may use natural language processing 138 to convert the voice input into generalized commands 126. The database management software 112 includes an artificial intelligence (AI) 140. While a single AI 140 is illustrated, it should be understood that the AI 140 may include multiple AI algorithms, where each AI algorithm is designed for a specific purpose (e.g., a first AI algorithm for auto completion, a second AI algorithm for subsequent command suggestions, a third AI algorithm for logs and error message analysis, and so on). The AI 140 may display auto completion 120 of input 118 provided by the user. The AI 140 may include Bayesian network, Hidden Markov model, Kalman filter, Particle filter, Decision theory, Utility theory, a classifier, a statistical learning, decision tree, K-nearest neighbor, support vector machine, artificial neural network, deep learning, or any combination thereof. For example, the user may begin to provide the input 118 and the AI 140 may predict the input 118 and display one or more of the auto completions 120. The auto completions 120 may include one or more predictions based on the portion of the input 118 provided by the user. For example, the auto completions 120 may be predicted based on (i) a command history associated with the user providing the input 118, (ii) a command history associated with all users in the enterprise 110, (iii) a command history associated with the databases 108, or (iv) any combination thereof. The user may provide a selection 121 of one of the auto completions 120. The AI 140 may convert the selection 121 from the auto completions 120 into one or more generalized commands 126. The auto completion 120 of the input 118 may be based on a history of commands input by a particular user or a history of commands input by all users that use the UI 114. In some cases, the user may select whether the auto completion 120 of the input 118 is based on (i) a history of commands input by a particular user or (ii) a history of commands input by all users that use the UI 114. For example, the user may create a user profile and select one of the selections (i) or (ii). In other cases, a system administrator may select whether (i) or (ii) is used when predicting the auto completions 120.

After receiving the input 118, the AI 140 may provide one or more suggestions 122 that includes commands predicted to follow the input 118. For example, the AI 140 may analyze previously executed commands by each user and predict, based on a particular user, which subsequent command the particular user executes after executing a particular command. For example, a user may frequently (e.g., more than a threshold percentage) list the contents of a directory and subsequently perform a particular command to a particular file in the directory. When the user provides "list directory contents" as the input 118, the AI 140 may predict that the user may perform the particular command and display the particular command in the suggestions 122. If the user performs one of M (M>0) commands after listing the directory, then the AI 140 may display the M commands in the suggestions 122. The user can select 121 one of the suggestions 122 or ignore the suggestions 122 and provide a different command. If the user frequently performs the different command, then the AI 140 may, based on the frequency, include the different command in the suggestions 122. The UI 114 may include a command menu 124 that includes a drop-down menu of commonly performed commands. The UI 114 may provide a search function 125 to enable the user to search the command menu 124 for a particular command. In this way, the user can avoid scrolling through multiple commands in the command menu 124 and can instead simply search for the desired command.

The computing device 102 may receive one or more logs and/or error messages 141 from the servers 104, including logs and/or error messages generated by the databases 108 hosted by the respective servers 104. In some cases, the computing device 102 may receive the logs and/or error messages 141 from the servers 104 substantially in real-time (e.g., when a log or error message is generated on a server 104, the log or error message is sent as the logs and/or error messages 141. If a large number of logs or error messages are generated in a short amount of time (e.g., Y seconds), then the servers 104 may self-throttle by gathering logs and/or error messages in a particular time period and then sending the gathered logs and/or error messages. The computing device 102 may store the logs and/or error messages 141 as logs/error messages 142. An error message is generated by an operating system or a software application (including a database application such as the database 108) being executed by the servers 104 when an unexpected condition occurs. A log is a file (e.g., log file) that includes a record of events that occur in an operating system (OS) or a software application (including a database application such as the database 108). An error message or a log file are automatically created (by the OS or application) and time-stamped to document events associated with each server 104. Typically, a log is informational while an error message indicates a potential issue. For example, when an application is installed, the installer may create an installation log that documents the installation process, including, for example, which files were installed, a location of each of the files that were installed, size of each file that was installed, the user or process that initiated the installation process, when the installation started, when the installation completed, and other information related to the installation of the application. If during installation of the application an error occurs, such as a drive having insufficient space to store an installation file, then the application installer may create an error message in addition to creating an installation log. The installation log may include an event indicating that the error message was created during the installation process.

The database management software 112 includes an activity log repository 150 (e.g., an audit trail) to track changes made to each database 108. The activity log repository 150 is a change tracking mechanism that maintains an activity log for each change made to each database, including when (e.g., timestamp including date and time) the change was made, a username of a user that made the change, a privilege level associated with the username, what commands were performed (e.g., read, write, delete, modify, or the like), and the like. An administrator may specify additional information that the database management software 112 gathers for each change made to each database 108. In this way, the database management software 112 is able to provide centralized governance and tracking. For example, when a particular user makes a change to a particular database, an activity log is created and stored in the activity log repository. The activity log indicates the user identifier of the particular user, information about the particular database to which the change was made, the change(s) that the particular user made to the particular database, a timestamp indicating when the change was made, an internet protocol (IP) address of the device used to make the change, and other information gathered as specified by a system administrator.

The database management software 112 includes server & database information 148 that identifies a type of each database 108, a version of each database 108, a configuration of each database 108, what information is stored in each database 108, and other database related information as well as information about each server 104, such as a server manufacturer, processor information (e.g., clock speed, amount of cache, number of cores, and the like), memory information, storage information, input/output (I/O) information, and the like. After receiving the input 118, the database management software 112 converts the input 118 into one or more generalized commands 126. The database management software 112 determines, based on the generalized commands 126, a subset of the databases 108 that are associated with the generalized commands 126, identifies the type and version of each database in the subset of the databases 108, and translates (using the server & database information 148) the generalized commands 126 into database specific commands 130. For example, the input 118 may include "display all employees in the company sorted by department and sorted by salary within each department". The generalized command 126 may include a general set of commands, such as, for example "RETRIEVE <employee> IN <company name>, SORT BY <department>, IN EACH DEPARTMENT SORT BY <salary>". The database management software 112 identifies a subset of the databases 108 that include employee information, department information, and salary information, converts and displays the generalized commands 126 to database specific commands 130 for editing using a command editor 128, and sends edited commands 134 to one or more of the databases 108 to perform the database specific commands 130. If the DB specific commands 130 are not edited than the edited commands 134 may comprise the DB specific commands 130. In this example, salary information may be stored on one or more databases that are accessible to certain users (e.g., human resources (HR)) but is inaccessible to others to prevent unauthorized employees from accessing confidential information, such as salary information, and the like. For example, after a first company has purchased or merged with a second company, running payroll may involve (i) accessing a first database that uses a first technology (e.g., Oracle®) that stores information associated with the first company and (ii) accessing a second database that uses a second technology (e.g., MongoDB®) that stores information associated with the second company. The AI 140 may use the server & database information 148 to determine that the payroll information is stored in a particular set of databases (e.g., first database and second database), convert the generalized commands 126 into database specific commands 130, and send the database specific commands 130 to the particular set of databases. In this example, the edited commands 134 may include a first set of commands that are sent to the first database (e.g., Oracle®) and a second set of commands that are sent to the second database (e.g., MongoDB®). The AI 140 may use the server & database information 148 to determine which of the databases (e.g., the first database and the second database in this example) are affected by the edited commands 134 and send the edited commands 134 to the appropriate databases (e.g., in this example, the databases storing payroll information are affected by the edited commands 134). The command editor 128 may be used by power users, such as users familiar with the database specific commands, to enable the power users to edit the database specific commands 130 prior to sending the edited commands 134 to the subset of the databases 108. Of course, for nonpower users, such as those unfamiliar with the database specific commands, the edited commands 134 may comprise the database specific commands 130. Thus, for most users (e.g., nonpower users), the user states, in general terms, the desired goal as the input 118, which is used to create the generalized commands 126. The AI 140 determines which portion of the databases 108 are affected by the generalized commands 126, determines the technology associated with each of the affected databases 108, automatically converts the generalized commands 126 into database specific commands 130, and sends the database specific commands 130 as the edited commands 134 to the affected databases 108. The user can thus make queries without knowing which databases 108 are affected by the input 118 and without knowing which technology each of the affected databases are using.

The subset of the databases 108 may receive the edited commands 134 from the computing device 102 and perform the edited commands 134 to the data stored in the databases 108. Each database 108 in the subset of databases may send result(s) 135 of performing the edited commands 134 to the data stored in each database 108. The computing device 102 may receive the results 135, format each of the results 135 into a standardized format and style, and, where applicable, merge the standardized results 135 to create consolidated results 132. For example, a first result of the results 135 may include the employee information in a first format and a first style from a first type of database, a second result of the results 135 may include the department information in a second format and a second style from a second type of database, and a third result of the results 135 may include salary information in a third format and a third style from a third type of database. The consolidated results 132 may include the employee information, department information, and the salary information sorted as specified in the input 118. In this way, the user is unaware that the consolidated results 132 were obtained from multiple databases where two or more of the databases may be of different database types and may provide results 135 that each have a different format and style.

The database management software 112 may include health check scripts inventory 146. Each health check script 146 may include a set of (one or more) commands to check the health of one or more of the servers 104, one or more of the databases 108, or both. For example, if the server status 116(N) indicates that the database 108(N) has an issue, the user can run one of the health check scripts inventory 146 to determine additional information about the issue associated with the database 108(N). When a particular health script of the health check scripts 146 executes, the particular health script may analyze the logs/error messages 142 stored on the computing device 102. In some cases, the particular health script being executed may send a request to one or more of the servers 104 for additional information. The user can view the contents of a report created by the particular health script and zoom in to view additional information ("deep dive"). In some cases, the user making a selection to view additional data may cause the particular health script to call another health script or to gather additional data for presentation to the user.

The AI 140 may either (i) periodically (e.g., at a predetermined interval, such as every X seconds, X>0) or (ii) in response to a user request perform an analysis of at least a portion of the log/error messages 142. Based on the analysis, the AI 140 may provide one or more predicted issues and solutions (to the issues) 144 to address the cause of the logs/error messages 142. For example, every day, at a predetermined time (e.g., 4:00 AM), the AI 140 may perform the analysis of the logs/error messages 142, determine the predicted issues and solutions 144, and display a summary of the analysis and the predicted issues and solutions 144 in the associated server status 116. For example, one or more logs or error messages generated by the server 104(N) may be analyzed and a summary of the analysis and the predicted issues and solutions 144 displayed in the server status 116(N). In this way, a system administrator can view (in the UI 114) which of the servers 104 or the databases 108 have issues and review the predicted issues and solutions 144 to identify a potential solution to each issue. In some cases, the user may view the summary of the analysis and provide input 118 to run a particular script of the health check scripts inventory 146 to obtain additional information associated with the issues. In some cases, after running one or more of the health check scripts inventory 146, the AI 140 may provide additional predicted issues and solutions 144 based on the additional information obtained from executing the health check scripts inventory 146.

Thus, the database management software 112 enables management of multiple databases 108 in the heterogenous database system 100 which includes at least a first database provided by a first database vendor and a second database provided by a second database vendor, where the vendors include MongoDB®, Percona®, PostgreSQL®, Neo4j®, Cassandra®, Elasticsearch®, Oracle®, MySQL®, MariaDB®, MSSQL®, and the like. The database management software 112 provides UI 14 to enable the multiple types of databases 108 to be managed as if they were the same type of database.

The database management software 112 enables a user to send commands (query, modify, and the like) to multiple of the databases 108 by providing plain English commands as the input 118. The database management software 112 converts the plain English commands in the input 118 into database-specific commands 130. For example, assume that two or more companies have merged or one company has acquired one or more other companies and that each company uses a different type of database to store data, including human resources (HR) data. The database management software 112 receives input 118, such as voice input via a microphone, text input via a keyboard, a command selection via the command menu 124, or the like. Based on the input 118, the database management software 112 determines which of the databases 108 are affected by the input 118, identify the types of each of the affected databases, translates the input 118 into database-specific commands 130 to query the affected databases, sends the edited commands 134 to the affected databases (e.g., sends a first query to a first database, sends a second query to a second database, and so on), receives database-specific results 135 in a format and style associated with that type of database, standardizes the database-specific results to create standardized results (e.g., results in a standardized format), and merges the results to create a single file, e.g., the consolidated results 132, that includes the requested information in a uniform format and style. The database management software 112 works with multiple types of operating systems (OS), such as Windows®, Linux®, RedHat®, Ubuntu®, and the like.

The AI 140 performs various functions, including auto-completion of queries, analysis of logs and error messages to predict issues, predict suggestions to address the issues, convert the generalized commands 126 to database specific commands 130, and other AI functions, as described herein. For example, the user may begin providing the input 118 (e.g., part of a command) and the AI 140 predicts what command(s) the user is inputting and provides one or more predicted commands in a drop-down menu from which the user can provide the selection 121. The AI 140 may predict follow-up command, the suggestions 122, to previously provided input. For example, the AI 140 may predict that <command 1> is often (greater than a threshold percentage) followed by <command 2>. In this example, after providing <command 1> as input, the AI 140 may suggest performing <command 2>. As another example, the AI 140 may predict that <command 1> is often followed by either <command 2> or <command 3>. After providing <command 1> as input, the AI 140 may suggest performing either <command 2> or <command 3>.

The AI 140 may automatically perform one (or more) of the health check scripts inventory 146 for each database 108 and display the results in the server status 116. Executing one of the health check scripts inventory 146 may include performing an analysis of the logs/error messages 142 that occurred in a predetermined time interval (e.g., X seconds, X>0, such as X=60, 180, 300, or the like). In some cases, the AI 140 may perform a particular one of the health check scripts 146 (e.g., a script that involves gathering a large amount of detailed information and analyzing the gathered information) at a user-specified time (e.g., 4:00 AM), identify predicted issues (e.g., low disk space, malfunctioning drive, configuration issue, or the like), and provided predicted solutions (e.g., add an additional disk drive to increase disk space, replace the malfunctioning drive, reconfigure particular parameters of the operating system (OS) or database, or the like) as the predicted issues and solutions 144. In addition, the AI 140 may execute one or more of the health check scripts inventory 146 "on demand" or substantially in real-time. For example, if the user desires to check if an issue is present (e.g., the user observes that system is behaving unusually), then the user may instruct the AI 140 to perform one (or more) of the health check scripts inventory 146. The UI 114 displays the status of each server 104 and enables a user to adjust the granularity of the displayed data to zoom in and zoom out of the server status 116. For example, if the server status 116(N) indicates an issue, the user can zoom in and view details regarding the health of the server 108(N), including the health of the database 108(N) hosted by the server 104(N). Thus, the user can view the status of all the servers 104 and databases 108 at a glance when zoomed out and then zoom in to look at individual servers 104 or databases 108 to view more information. The server status 116 is presented in a uniform (e.g., standardized) format and style, regardless of the OS, type of database hosted by the server, and the like. In this way, a user is able to have an end-to-end view of the multiple servers 104 in the system 100.

The database management software 114 may receive input from multiple input devices, including, for example, a keyboard, a mouse (or similar, such as a trackball), a touchscreen display device, a microphone (to receive voice input), or the like. The database management software 114 may use voice recognition 136 and natural language processing (NLP) 138 to process voice input received from a microphone, convert the voice input to one or more generalized commands 126, and enable the user to edit the generalized commands 126 to create the edited commands 134 prior to sending the edited commands to one or more of the servers 104.

The database management software 112 includes the activity log repository 150, a change tracking mechanism (e.g., audit trail) to track changes made to each server 104. The activity log repository 150 includes an activity log documenting each change made to each server 104 (including each database 108), such as when (e.g., date and time) the change was made, a username of a user that made the change, a privilege level associated with the username, what change (e.g., configuration change, read, write, delete, modify, or the like) was made, and so on. A user may specify which information the database management software 112 gathers and stores as an activity log in the activity log repository 150.

The database management software provider server 152 may include database installers, such as the database (DB) installer 154, for each type of database. For example, when the system 100 is initially configured, the database management software provider server 152 may create a software repository 113 on the computing device 102 and store one or database installers 154 in the software repository 113, such as, for example, an Oracle® installer, a MongoDB® installer, or the like. The database management software provider server 152 may use the database installers 154 from the software repository 113 to install a particular database on a particular server in the system 100. Thus, the software repository 113 may be created and populated with the appropriate database installers 154 prior to the databases 108 being installed on the servers 104 to enable a fast installation process and increase cyber-security. The database management software 112 automatically obtains information about (1) the server (e.g., memory information, storage information, processor information, operating system type, operating system version, and the like) and (2) the database (e.g., type of database, database version, database configuration) and stores the information in the server & database information 148. If any of the servers 104 had databases installed on them before the database management software 112 was installed, then the server information and database information may be automatically obtained by the database management software 112 using a discovery process and stored in the server & database information 148. For any servers 104 and/or databases 108 that were configured before the database management software 112 was installed and for which the database management software 112 is unable to obtain information, the user may be asked to manually enter the information. Thus, each time a database is installed, the database management software 112 automatically obtains information about the server on which the database is installed and the database being installed and stores the information in the server & database information 148 to enable the UI 114 to display an end-to-end view of the servers 104 and databases 108 in the system 100.

The UI 114 may provide a drop-down command menu 124 of commonly performed commands (e.g., list contents of a directory using a "list directory" command). After a user provides the selection 121 from the command menu 124, the selection 121 is translated into database-specific command(s) 130 (e.g., "list directory" is translated to "ls-ltr"). Power users, e.g., users who are familiar with the database-specific language, may edit the displayed database-specific command(s) 130 using the command editor prior to sending the edited command(s) 134 to the appropriate database(s). Typically, non-technical users may select from the command menu 124, view the database-specific command(s) 130, and send the database-specific commands 130 without any edits. For example, the input 118 "list directory" may be translated to a database specific command "ls-ltr" and displayed.

The database management software 112 receives the results 135 from the databases 108 to which the edited command(s) 134 were sent, formats the individual results 135 into a standard format and style to create standardized results, and merges the standardized results to create the consolidated results 132 that are displayed via the UI 114. The UI 114 may provide a search function 125 to enable a user to search the command menu 124. The UI 114 enables a user to save a particular set of (one or more) commands that the user frequently executes in the command menu 124 as a macro or script.

Figure 2:
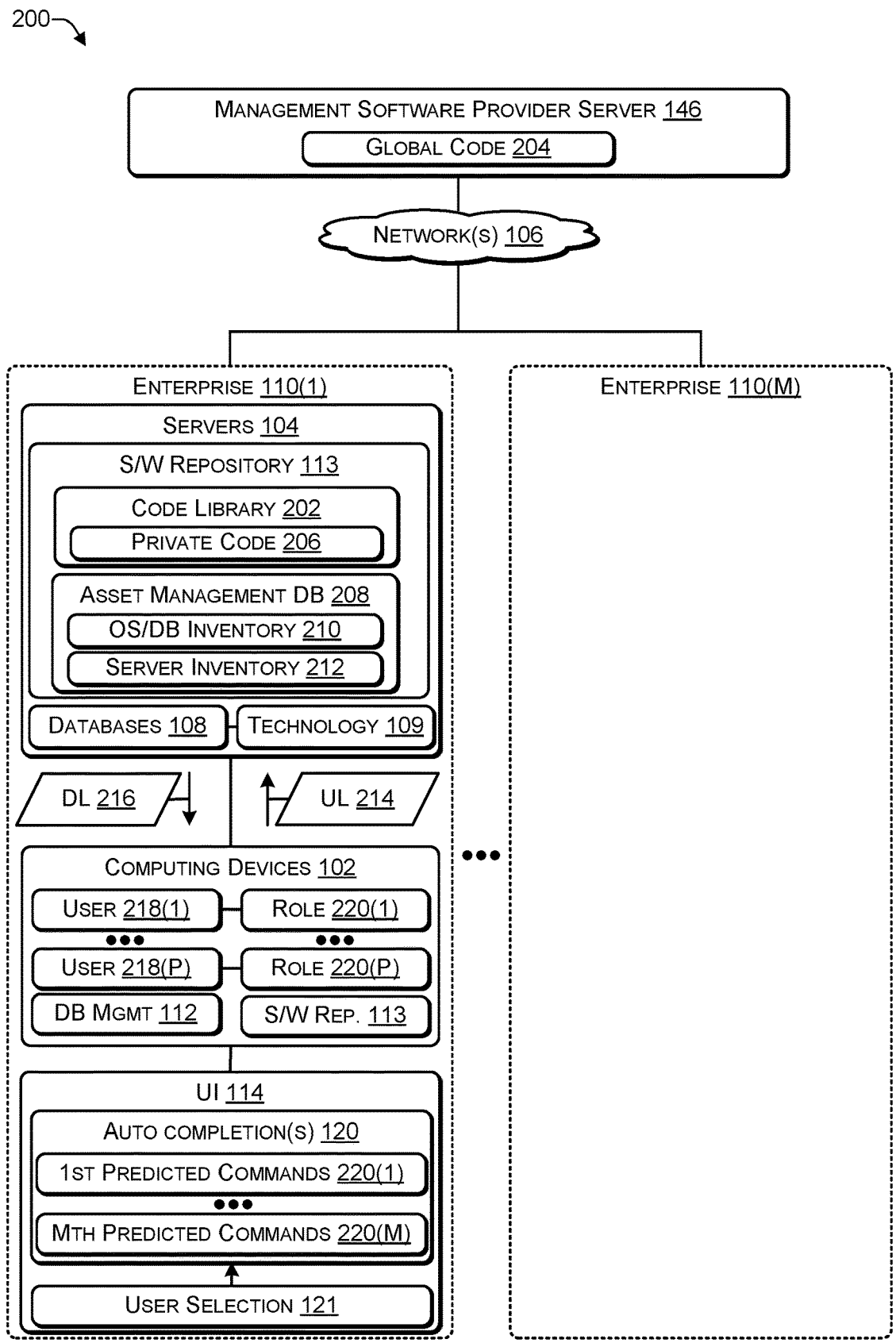
FIG. 2 is a block diagram of a system that includes multiple enterprises, with each enterprise having databases from one or more database providers, according to some embodiments.

FIG. 2 is a block diagram of a system 200 that includes multiple enterprises, with each enterprise having databases from one or more database providers, according to some embodiments. In the system 200, multiple enterprises 110(1) to 110(M) (M>0) are connected to the management software provider server 146 by one or more networks 106. Each enterprise 110 may include multiple servers 104, with each server 104 having one or more databases 108. Each enterprise 110 may have their own software repository 113 that includes database installers selected based on the technologies 109 used by each of the databases 108 in each enterprise 110.

The software repository 113 may store a code library 202 that includes a private code library 206. The management software provider server may store a global code library 204. The software repository 113 may include an asset management database 208 that includes an operating system and database (OS/DB) inventory 210 and a server inventory 212. The global code library 204 may include a global inventory of commands, macros, scripts and the like that has been uploaded (e.g., via upload (UL) 214) and are available to download 216 by any of the computing devices 102 in any of the enterprises 110. The private code library 206 may include a custom inventory of commands, macros, scripts and the like that was uploaded (e.g., using the upload 214) and is available for download (DL) 216 only by particular (e.g., specified) computing devices 102 of each individual enterprise 110. In this way, a particular enterprise customer 110 can share commands, macros, scripts and the like with other computing devices 102 in the enterprise 110 by placing the commands, macros, scripts, and the like in the global code inventory 204. A particular enterprise customer 110 may store commands, macros, scripts and the like in the private code library 206 for use only by authorized employees, such as system administrators, or the like. In this way, the contents of the private code library 206 may not be accessible to everyone in the enterprise. The global code inventory 204 may be accessible to any of the computing devices 102 in individual ones of the enterprises 110. For example, the global code inventory 204 may be cloud-based. The private code inventory 206 may be stored on a particular computing device (e.g., "on-premises") of the computing devices 102 and may not be accessible to other computing devices in the enterprise 110.

Each of the computing devices 102 in a particular enterprise 110 may include users 218(1) to 218(P) that have been provisioned to login and use each of the computing devices 102. Each user 218 may have a corresponding role 220 that includes privileges identifying what type of commands the user can perform. For example, to protect the data stored in each of the databases 108, a first set of users may not be permitted to modify data stored in the databases 108 while a second set of users, e.g., with a higher privilege level, may be permitted to modify the data stored in the databases 108. Some users may be permitted to access particular databases that include confidential information while other users may not be permitted to access the particular databases. When a particular user performs one or more commands to one of the servers 104 or the databases 108, the user 218 and the corresponding role 220 along with the one or more commands along with the timestamp may be stored as an activity log in the activity log repository 150 of FIG. 1.

The UI 114 may display one or more predicted auto completions 120, such as, for example, a first set of predicted commands 220(1) to an Mth set of predicted commands 220(M) (M>0). A user may provide the user selection 121 to select one of the set of predicted commands 220 to create the generalized (e.g., selected) commands 126 of FIG. 1.

Figure 3:
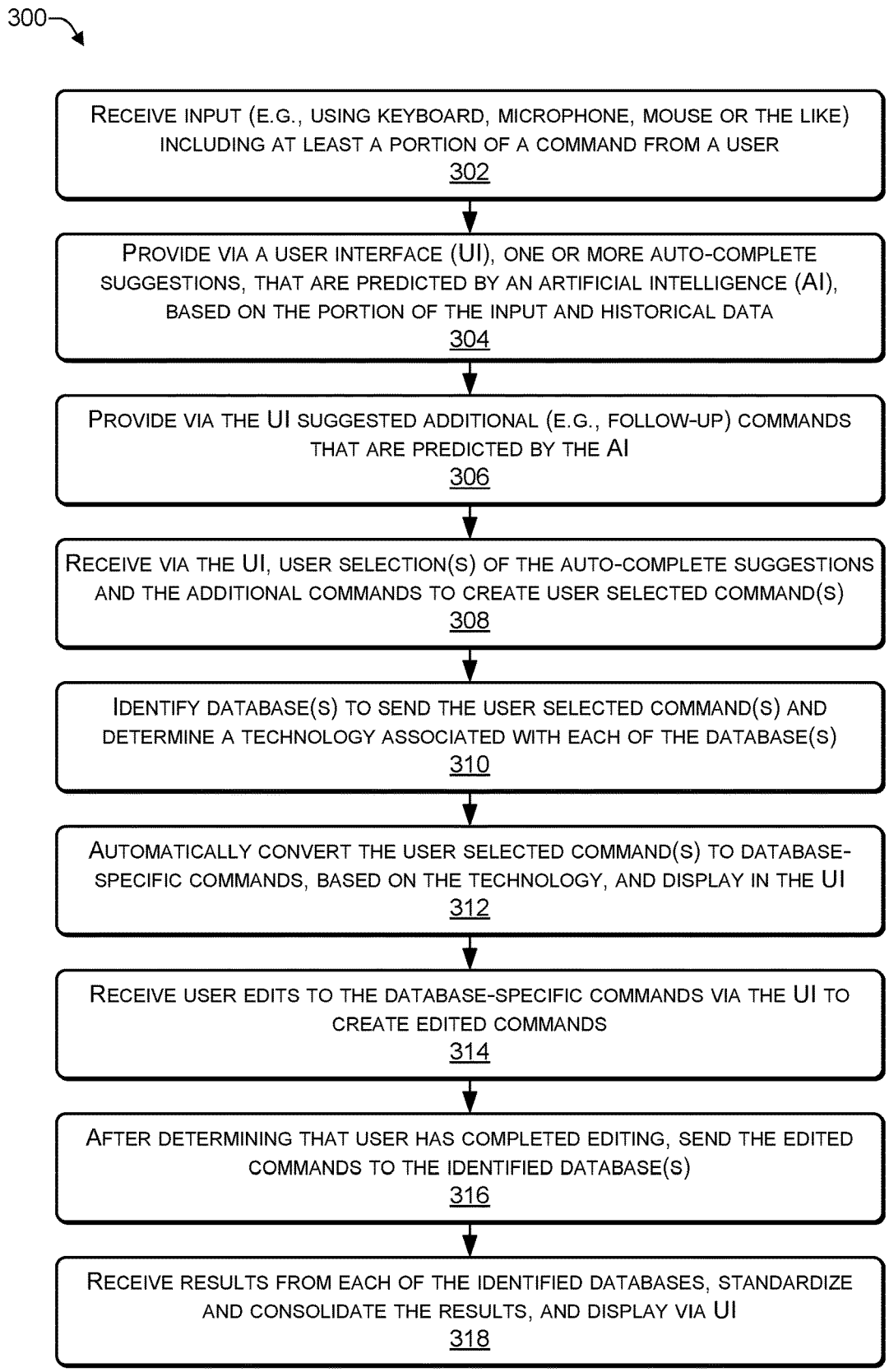
FIG. 3 is a flowchart of a process that includes automatically converting user selected commands into database-specific commands, according to some embodiments.
Figure 4:
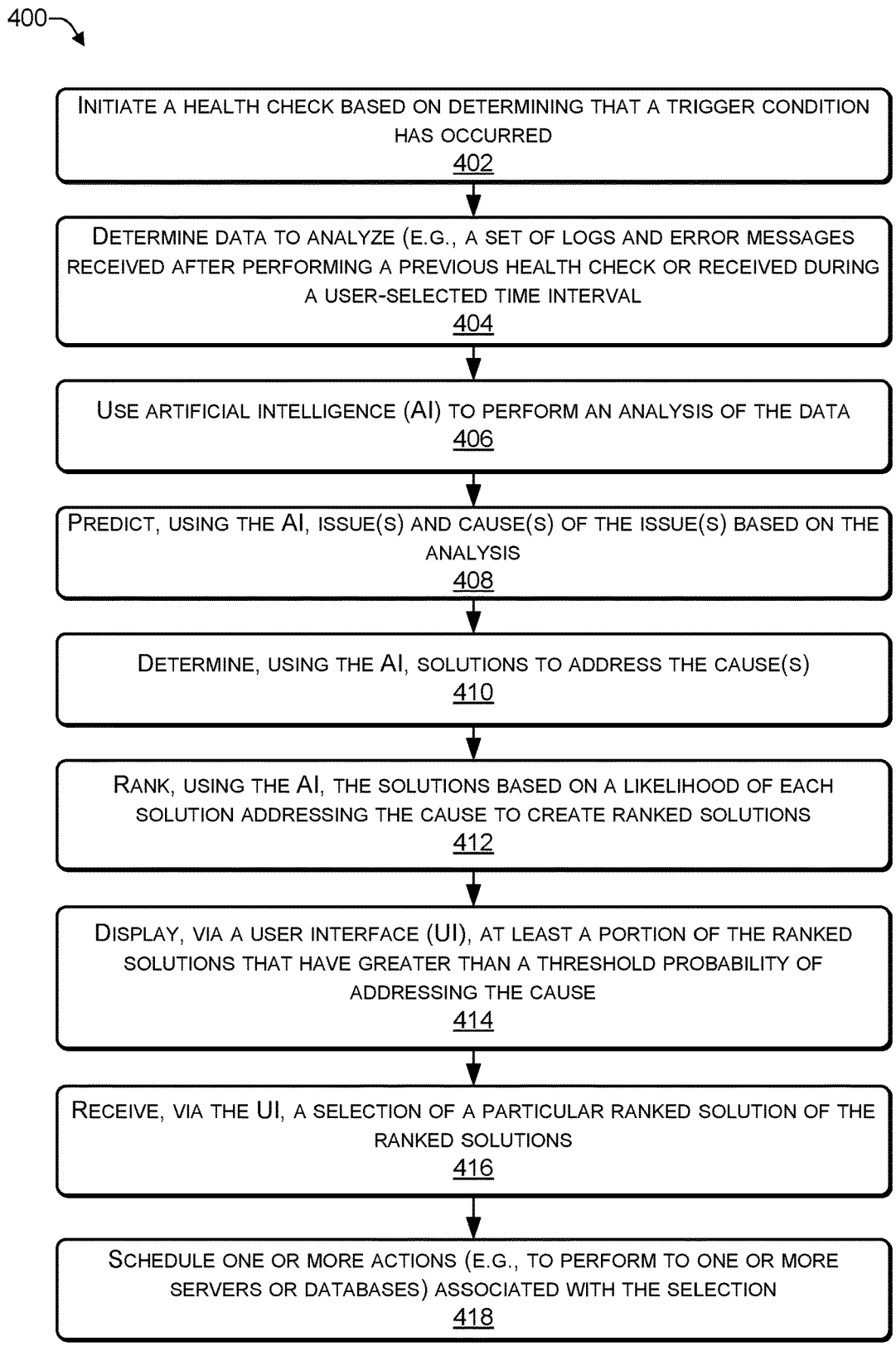
FIG. 4 is a flowchart of a process that includes using an artificial intelligence (AI) to provide ranked solutions based on analyzing logs and error messages, according to some embodiments.
Figure 5:
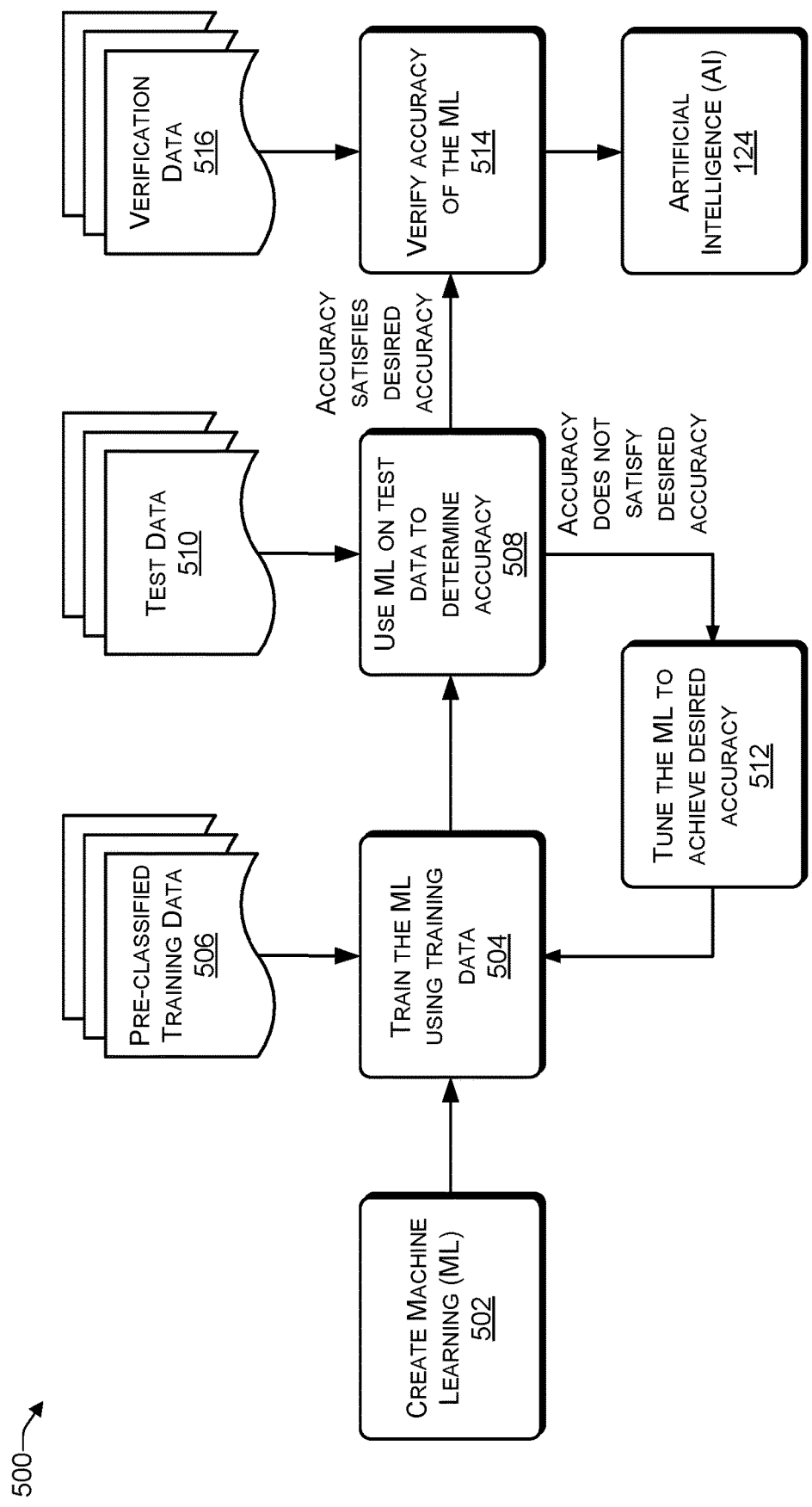
FIG. 5 is a flowchart of a process to train a machine learning algorithm to create a classifier, according to some embodiments.

In the flow diagrams of FIGS. 3, 4, and 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2 as described above, although other models, frameworks, systems and environments may be used to implement this process.

FIG. 3 is a flowchart of a process 300 that includes automatically converting user selected commands into database-specific commands, according to some embodiments. The process 300 may be performed by the database management software 112 of FIGS. 1 and 2.

At 302, the process may receive at least a portion of an input from a user. At 304, the process may provide, via a user interface (UI), one or more auto-completion suggestions that are predicted (determined) using artificial intelligence (AI) and based on the portion of the input received from the user and from historical data. At 306, the process may provide, via the UI, additional suggested commands predicted (determined) by the AI. For example, in FIG. 1, the database management software 112 may receive, via the UI 114, input 118 that includes at least a portion of a command and provide, via the UI 114, the auto completions 120 and the suggestions 122 based on the input 118 and historical data, such as the data in the activity log repository 150

At 308, the process may receive, via the UI, one or more user selections of the auto-complete suggestions and the additional commands to create user selected commands. For example, in FIG. 1, the database management software 112 may receive, via the UI 114, one or more selections 121 of the auto completions 120 and the suggestions 122 and create the generalized commands 126.

At 310, the process identifies one or more databases to send the user selected commands and determines a technology (e.g., type of database) associated with each of the databases. At 312, the process automatically converts the user selected commands to database-specific commands based on the technology associated with each of the databases and displays the database-specific commands in the UI. For example, in FIG. 1, the database management software 112 may determine (based on the server & database information 148) which of the databases 108 are affected by the generalized commands 126 (e.g., which databases include data to which the commands will be applied). The database management software 112 may determine a type of technology (e.g., type of database, such as Oracle®, MongoDB®, Cassandra®, or the like) associated with each of the identified databases based on the server & database information 148. The database management software 112 may convert the generalized commands 126 into database specific commands 130 based on the type of database associated with each of the identified databases. For example, the database management software 112 may determine that the generalized commands 126 are requesting (or modifying) data that resides on three databases. The database management software 112 may determine that the three databases include a first type of database (e.g., Oracle®), a second type of database (e.g., MongoDB®), and a third type of database (Cassandra®). Based on the generalized commands 126, the database management software 112 creates the database specific commands 130, including a first set of commands for the first type of database, a second set of commands for the second type of database, and a third set of commands for the third type of database.

At 314, the process receives zero or more user edits to the database specific commands via the UI to create edited commands. At 316, after determining that the user has completed editing the commands, the process sends the edited commands to the identified databases. For example, in FIG. 1, the command editor 128 may enable a user to edit the database specific commands 130 to create the edited commands 134. After the database management software 112 determines that the user has completed editing the database specific commands 130, the database management software 112 may send the edited commands 134 to the appropriate databases 108. Using the previous example, sending the edited commands 134 may include sending the first set of commands may be sent to a first database 108(A), sending the second set of commands may be sent to a second database 108(B), and sending the third set of commands may be sent to a third database 108(C), where 0<A, B, C<N. In this way, Oracle® commands are sent to the Oracle® database, Mongo® commands are sent to the Mongo® database, and Cassandra® commands are sent to the Cassandra® database. This is done without the user knowing a type (technology) of the first, second, and third databases and without knowing three different types of database languages. Instead, the database management software 112 takes plain English commands, identifies the affected databases, determines the type of each affected database, and converts the plain English commands into database specific commands.

At 318, the process may receive results from each of the identified databases, standardize the results, consolidate the results, and display the consolidated results via the UI. For example, in FIG. 1, the database management software 112 may receive the results 135 from one or more of the databases 108 to which the edited commands 134 were sent, standardize the results 135 to create standardized results, consolidate the results to create the consolidated results 132, and display the consolidated results 132 by the UI 114.

Thus, a user interface of database management software may receive input from a user that includes a portion of a command. An AI built into the database management software provides auto completion suggestions by predicting, based on the input, one or more commands. In some cases, the AI may predict one or more additional (e.g., follow-up) commands based on the one or more commands. The one or more commands and the one or more additional commands may be displayed in a UI. The user may select from the one or more commands and the one or more additional commands displayed in the UI. The user selection is displayed as one or more generalized commands. The AI determines which particular databases are affected by the generalized commands. For example, the generalized commands may query or modify data stored in a particular set of databases and the AI may identify the particular set of databases that include the data that is affected by the generalized commands. The AI determines a type of database each of the databases in the particular set of databases and converts the generalized commands into a set of database specific commands. For example, the AI may create a first set of database specific commands for a first type of database, a second set of database specific commands for a second type of database, and so on. In this way, the user does not need to know what type of databases are affected by the commands. The database specific commands are displayed in the UI to enable the user to edit them, if the user desires. For example, a power user that is familiar with the database specific commands may edit the database specific commands to create edited commands. The database specific commands (with edits, if they were edited by the user) are sent to the servers hosting the affected databases.

Each of the affected databases return individual results. The individual results include a result of performing the database specific commands to the particular database and any associated logs, error messages, and the like resulting from performing the database specific commands. For example, a query command may provide results of performing the query and a message indicating whether the query command was successfully performed. As another example, a result of performing a modify command may indicate whether the modify command was successfully performed. If the modify command was unsuccessful, the result may indicate one or more issues that prevented the modify command from being successfully performed. To illustrate, the result may indicate that the user sending the modify command does not have the correct privilege level (or permissions) to modify the data in the database. The database management software receives the individual results from each of the particular databases to which the database specific commands were sent, modifies the individual results by modifying the results into a standardized format and style, such that the standardized results from different types of databases have a same format and style. In some cases, the database management software may merge the standardized results from each of the particular databases to create a consolidated set of results.

FIG. 4 is a flowchart of a process 400 that includes using an artificial intelligence (AI) to provide ranked solutions based on analyzing logs and error messages, according to some embodiments. The process 400 may be performed by the database management software 112 of FIGS. 1 and 2.

At 402, the process initiates a health check based on determining that a trigger condition has occurred. At 404, the process may determine data to analyze (e.g., a set of logs and error messages received (i) after performing a previous health check or (ii) generated in a user selected time interval (e.g., X seconds, X>0). For example, in FIG. 1, the database management software 112 may, after determining that a trigger condition has occurred, perform one or more of the health check scripts inventory 146. The trigger condition may occur every X seconds, to enable the status of each server and each database to be displayed in near real-time. The trigger condition may occur when a user provides, via the UI 114, a request to execute one or more of the health check scripts inventory 146. Based on determining that one of the trigger conditions has occurred, the database management software 112 may execute one or more of the health check scripts inventory 146. The health check scripts inventory 146 may gather data including retrieving logs and error messages from the logs/error messages 142 that occurred after a previous health check was performed. For example, if the previous health check is performed daily at 4:00 AM, then the health check script being executed may gather the logs and error messages that occurred after the health check was performed on a previous day. As another example, the user may specify that data during a particular time interval be analyzed by specifying a start time and an end time. To illustrate, if a server was recently configured and a new database installed on the server, then the user may specify that data including errors and log messages generated from the time that the installation of the new database was completed to a current time be analyzed. Executing one of the health check scripts inventory 146 together data may include sending a request for particular information from one or more of the servers 104, one or more of the databases 108, or both.

At 406, the process may use AI to perform an analysis of the data. At 408, the process may use the AI to predict, based on the analysis, one or more issues in the system and one or more causes of the issues. For example, in FIG. 1, the AI 140 may be used to perform an analysis of the data gathered, such as a portion of the logs and error messages in the logs/error messages 142. The AI 140 may, based on the analysis, predict one or more issues that are causing the logs and/or error messages.

At 410, the process may use the AI to determine one or more solutions to address the causes of the issues. At 412, the process may use the AI to rank the solutions based on the likelihood of each solution addressing the cause to create ranked solutions. At 414, the process may display, via a user interface (UI), at least a portion of the ranked solutions that have greater than a threshold probability of addressing the cause. For example, in FIG. 1, the AI 140 may perform analysis of the data gathered from executing the health check scripts inventory 146, including at least a portion of the logs/error messages 142, and determine predicted issues and solutions 144. The AI 140 may rank the predicted issues and solutions 144 based on a probability associated with the production (e.g., 90% probability that a drive has failed in a server, 80% probability that a drive is running out of space, or the like). The AI 40 may display at least a portion of the ranked predicted issues and solutions 144 via the UI 114.

At 416, the process may receive, via the UI, a selection of a particular ranked solution of the ranked solutions. A 418, the process may schedule one or more actions (e.g., to perform to one or more servers or databases) associated with the selection. For example, in FIG. 1, the database management software 112 may receive a selection from a user of one of the predicted issues/solutions 144. In response to receiving the selection, the database management software 112 may schedule one or more actions to be performed to one or more of the servers 104, the databases 108, or both. For example, if a server or a database is to be reconfigured, then the database management software 112 may schedule a reconfiguration at a time when the server or databases being used a least amount to minimize impact. As another example, if a server is determined to benefit from a hardware upgrade (e.g., by adding additional processing power or by adding additional storage), then the database management software 112 may schedule a time for the hardware upgrade to be performed.

Thus, a database management software may perform a health check script at a predetermined time, in response to a user request, or in response to determining that another trigger condition occurred. The database management software may determine data, including logs and error messages, to analyze. In AI may be used to perform an analysis of the data and predict issues and solutions based on the analysis. The AI may rank the issues and solutions based on a probability of occurrence to create ranked issues and solutions. The AI may display at least a portion of the ranked issues and solutions on a UI. After receiving a selection of one of the ranked issues and solutions from a user, the database management software may schedule one or more actions based on the selection. In this way, the health of the system is proactively maintained by periodically running health checks and displaying the results on the UI to enable a user to view the health status of each of the servers in each of the databases in the system. The user does not have to use a first UI to determine the health of a first type of database, does not have to use a second UI to determine the health of a second type of database, and so on. Thus, the database management software makes managing and maintaining the health of a heterogeneous database system very easy.

FIG. 5 is a flowchart of a process 500 to train a machine learning algorithm to create the AI 124, according to some embodiments. The process 500 may be performed by a server, such as the computing device 102 of FIG. 1.

At 502, a machine learning algorithm (e.g., software code) may be created by one or more software designers. For example, the machine learning algorithm may include the AI 140, the natural language processing 140, or both. At 504, the machine learning algorithm may be trained using pre-classified training data 506. For example, the training data 506 may have been pre-classified by humans, by machine learning, or a combination of both. After the machine learning has been trained using the pre-classified training data 506, the machine learning may be tested, at 508, using test data 510 to determine an accuracy of the machine learning. For example, in the case of a classifier, the accuracy of the classification may be determined using the test data 510.

If an accuracy of the machine learning does not satisfy a desired accuracy (e.g., 95%, 98%, 99% accurate), at 508, then the machine learning code may be tuned, at 512, to achieve the desired accuracy. For example, at 512, the software designers may modify the machine learning software code to improve the accuracy of the machine learning algorithm. After the machine learning has been tuned, at 512, the machine learning may be retrained, at 504, using the pre-classified training data 506. In this way, 504, 508, 512 may be repeated until the machine learning is able to classify the test data 510 with the desired accuracy.

After determining, at 508, that an accuracy of the machine learning satisfies the desired accuracy, the process may proceed to 514, where verification data 516 may be used to verify an accuracy of the machine learning. After the accuracy of the machine learning is verified, at 514, the machine learning 130, which has been trained to provide a particular level of accuracy, may be used as the natural language processing 138, the AI 140, or both. The AI 140 may include multiple AI engines, with each AI engine receiving its own individual training. For example, a first AI engine may perform the auto completion 120, a second AI engine may provide the command suggestions 122, a third AI engine may provide the predicted issues/solutions 144, and so on.

Figure 6:
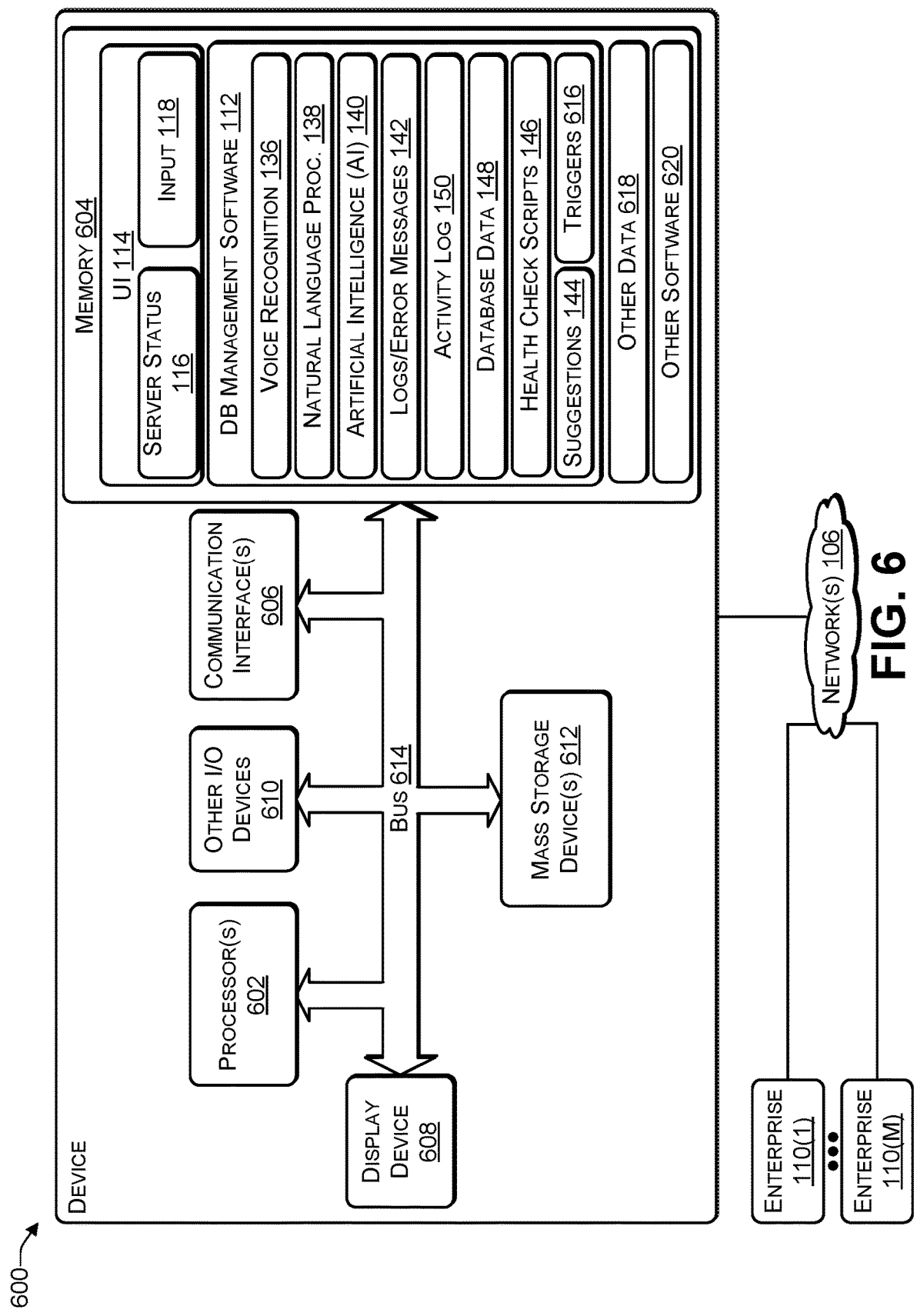
FIG. 6 illustrates an example configuration of a computing device that can be used to implement the systems and techniques described herein.

FIG. 6 illustrates an example configuration of a device 600 that can be used to implement the systems and techniques described herein, such as for example, individual ones of the servers 104 or the computing device 102. In FIG. 6, the device 600 is illustrated as implementing the computing device 102 of FIGS. 1 and 2.

The device 600 may include one or more processors 602 (e.g., central processing unit (CPU), graphics processing unit (GPU), or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a multiple processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 106. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data, including, for example, the UI 114, the software 112, triggers 616, other data 618, and other software 620. The triggers 616 may be the trigger conditions described in FIG. 4. For ease of illustration, not all the software and data is shown.

Figure 7:
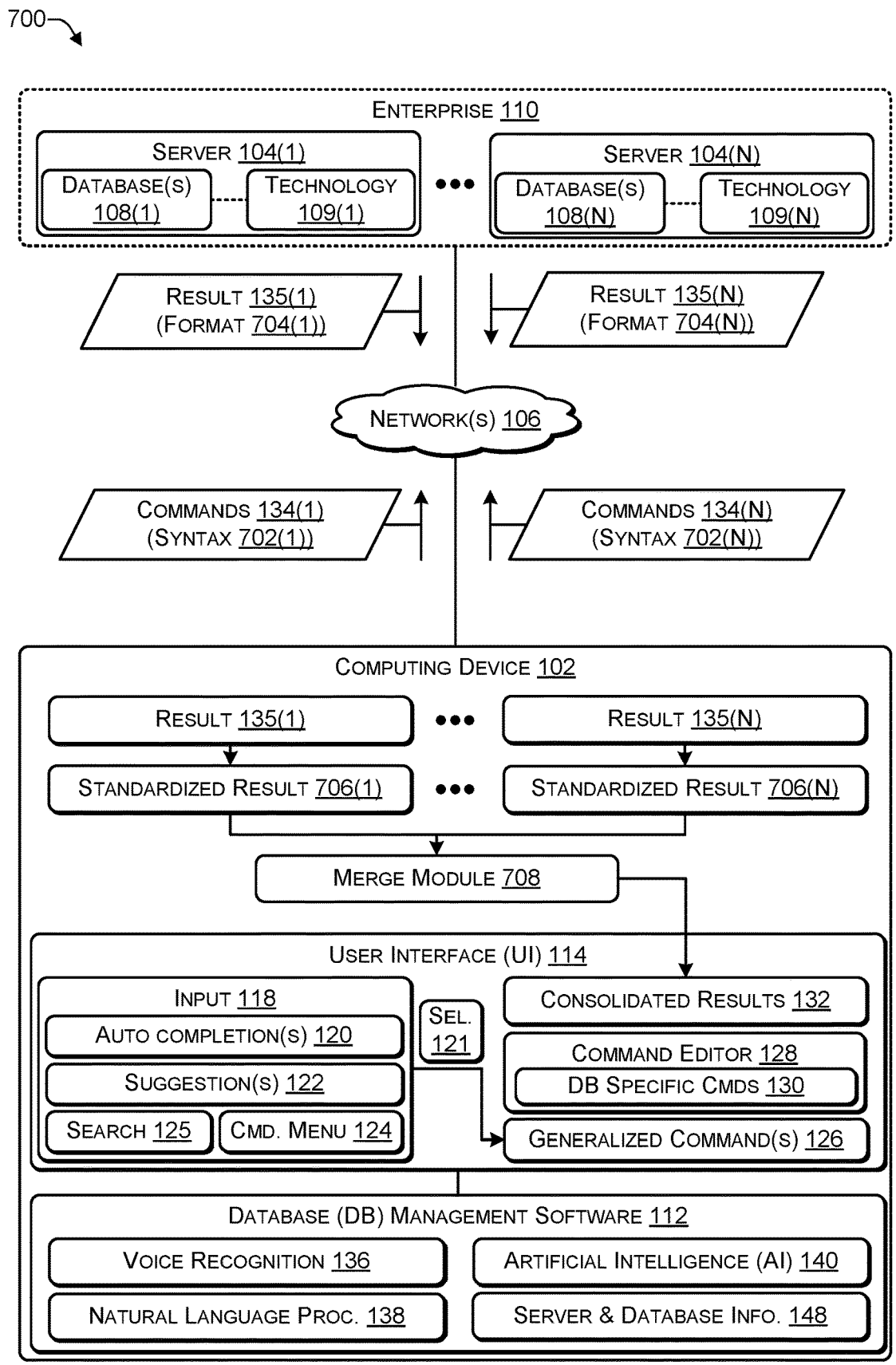
FIG. 7 is a block diagram of a system that includes multiple database technologies, according to some embodiments.

FIG. 7 is a block diagram of a system 700 that includes multiple database technologies, according to some embodiments. The system 700 provides additional details around sending database specific commands to databases and receiving the results from those databases. In the enterprise 110, each of the servers 104 may include one or more databases 108. Each of the databases 108 may have an associated technology 109. For example, the database 108(1) has a first technology 109(1) and the database 108(N) has an Nth technology 109(N) that is different from the technology 109(1). To illustrate, the technology 109(1) may be Oracle® while the technology 109(N) may be MongoDB®.

After the user provides the input 118, the database management software 112 may provide one or more auto completions 120 from which the user makes a selection 121 to create the generalized commands 126. The AI 140 may use the server & database information 148 to determine which of the databases 108 are affected by the generalized commands 126 and then convert the generalized commands 126 into the database specific commands 130. If the user is a power user, the user may use the command editor 128 to edit the database specific commands 130 to create the commands 134. If the user is not a power user, the database specific commands 130 may be sent to the databases 108 as the commands 134. The commands 134(1) are sent to the database 108 (1) and have a database specific syntax 702(1) that is understood by the technology 109(1). The commands 134(N) are sent to the database 108 (N) and have a database specific syntax 702(N) that is understood by the technology 109(N).

After the database 108(1) has executed the commands 134(1) in the syntax 702(1), the database 108(1) sends results 135(1) in format 704(1), e.g., based on the technology 109(1). After the database 108(N) has executed the commands 134(N) in the syntax 702(N), the database 108 (N) sends results 135(N) in format 704(N), e.g., based on the technology 109(N).

The computing device 102 may receive the results 135 and convert them to a standardized format. For example, the computing device 102 may receive the result 135(1) and convert the result 135(1) from the format 704(1) to a standardized format to create standardized result 706(1). The computing device 102 may receive the result 135(N) and convert the result 135(N) from the format 704(N) to a standardized format to create standardized result 706(N). A merge module 708 may merge the standardized results 706(1) to 706(N) to create the consolidated results 132 that are displayed on the UI 114.

There are several advantages to the system. First, a user can use plain English commands to perform actions to multiple databases without having to know which particular technology each database uses. The database management software determines the technology used by the databases affected by the user's commands and converts the user's commands into database specific commands that have a syntax that is understood by the affected database technology. For example, if the user's commands are payroll related, the database management software identifies the databases that store payroll information and creates commands in a syntax understood by the identified databases. As another example, if the user's commands are sales related, the database management software identifies the databases that store sales information. The database specific commands are sent to the previously determined (e.g., affected) databases. The individual databases receive and perform the database specific commands and provide a result that is formatted according to the technology used by the individual databases. The database management software receives results from the individual databases, converts each result into a standardized format to create standardized results, and merges the standardized results to create consolidated results. A second advantage is that the results provided by the different database technologies are converted into a standardized format, such that the same type of information appears in the same location and is formatted using the same font, font size, and the like. For example, payroll results from multiple databases are converted into a standardized format where the order of the fields, such as employee name, employee salary, and the like, are the same and have the same font, font size, and the like. A merge module merges the standardized results to create a single file that includes information from multiple databases. For example, the merge module may merge payroll files from multiple databases alphabetically according to the last name of each employee. As another example, the merge module may merge sales data from multiple and group the sales data by city and state and order the grouped data by an amount of sales in a specified period, e.g., from largest to smallest. Thus, a third advantage is that the results from multiple databases are merged into a single file and the data grouped and ordered based on criteria specified by the user in the user input.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A computing device comprising:
one or more processors; and
one or more non-transitory computer-readable storage media to store instructions executable by the one or more processors to perform operations comprising:

receiving, via a user interface of a software application, input including at least a portion of a set of commands;

determining, using an artificial intelligence algorithm and based on the input and based on historical data that includes previously input commands, one or more predicted sets of commands;

receiving, via the user interface, a user selection of a set of predicted commands from the one or more predicted sets of commands to create a user selected set of commands;

determining, by the software application, a plurality of databases affected by the user selected set of commands;

determining, by the software application, a plurality of database vendors associated with the plurality of databases;

converting the user selected set of commands into a plurality of database specific commands comprising at least first database specific commands and second database specific commands; and sending the first database specific commands to a first database of the plurality of databases, wherein the first database and the first database specific commands are associated with a first database vendor of the plurality of database vendors; and sending the second database specific commands to a second database of the plurality of databases, wherein the second database and the second database specific commands are associated with a second database vendor that is different from the first database vendor of the plurality of database vendors.

2. The computing device of claim 1, wherein:
the plurality of database specific commands further comprises third database specific commands.

3. The computing device of claim 2, wherein the operations further comprise:
sending the third database specific commands to a third database of the plurality of databases, wherein the third database and the third database specific commands are associated with a third database vendor that is different from both the first database vendor and the second database vendor.

4. The computing device of claim 1, wherein the operations further comprise:
receiving, from a command editor of the user interface, one or more edits to at least one command of the plurality of database specific commands to created edited commands.

5. The computing device of claim 4, wherein:
sending the first database specific commands to the first database of the plurality of databases comprises sending the edited commands to the first database of the plurality of databases.

6. The computing device of claim 1, wherein the operations further comprise:
receiving first results from a first server hosting the first database after performing the first database specific commands to the first database;
converting the first results into first standardized results;
receiving second results from a second server hosting the second database after performing the second database specific commands to the second database;
converting the second results into second standardized results;
merging the first standardized results and the second standardized results to create consolidated results; and displaying the consolidated results using the user interface of the software application.

7. The computing device of claim 1, wherein:
the input comprises voice input received from a microphone connected to the computing device; and
the operations further comprise:
performing voice recognition and natural language processing to the voice input to determine the portion of the set of commands.

8. A memory device to store instructions executable by one or more processors to perform operations comprising:
receiving, via a user interface of a software application, input including at least a portion of a set of commands;

determining, using an artificial intelligence algorithm and based on the input and based on historical data that includes previously input commands, one or more predicted sets of commands;

receiving, via the user interface, a user selection of a set of predicted commands from the one or more predicted sets of commands to create a user selected set of commands;

determining, by the software application, a plurality of databases affected by the user selected set of commands;

determining, by the software application, a plurality of database vendors associated with the plurality of databases;

converting the user selected set of commands into a plurality of database specific commands comprising at least first database specific commands and second database specific commands; and sending the first database specific commands to a first database of the plurality of databases, wherein the first database and the first database specific commands are associated with a first database vendor of the plurality of database vendors; and sending the second database specific commands to a second database of the plurality of databases, wherein the second database and the second database specific commands are associated with a second database vendor that is different from the first database vendor of the plurality of database vendors.

9. The memory device of claim 8, wherein the operations further comprise:
determining that a trigger condition occurred;
initiating a health check based on determining that the trigger condition occurred; and
displaying, via the user interface, a result of performing the health check, the result comprising a status of at least one database of the plurality of databases.

10. The memory device of claim 9, wherein determining that the trigger condition has occurred comprises one of:
determining that a current time comprises a predetermined time; or
determining that a request to perform the health check was received from the user interface.

11. The memory device of claim 9, wherein the health check comprises:
determining one or more logs that occurred within a specified time period;
determining one or more error messages that occurred within the specified time period;
performing, using a second artificial intelligence algorithm, an analysis of the one or more logs and the one or more error messages;

predicting, based on the analysis, one or more issues associated with at least one database of the plurality of databases;

determining, using the second artificial intelligence algorithm and based at least in part on the analysis, one or more solutions to address at least one issue of the one or more issues;

ranking the one or more solutions based at least in part on a predicted probability that each solution of the one or more solutions addresses the at least one issue to create ranked solutions; and displaying, via the user interface, at least a threshold number of the ranked solutions.

12. The memory device of claim 11, wherein the operations further comprise:

receiving, via the user interface, a user selection of a particular solution of the ranked solutions; and scheduling one or more actions to perform to at least one database of the plurality of databases based at least in part on the user selection of the particular solution.

13. The memory device of claim 11, wherein the operations further comprise:

determining a timestamp indicating a time associated with sending the first database specific commands to the first database;

determining a username associated with a user providing the input;

creating an activity log comprising the timestamp, the username, and the first database specific commands; and storing the activity log in an activity log repository.

14. The memory device of claim 8, wherein the operations further comprise:

after performing the first database specific commands to the first database:

receiving a first log from the first database, the first log indicating a status of performing the first database specific commands to the first database; and storing the first log in the memory device.

15. A computer-implemented method comprising:

receiving, via a user interface of a software application, input including at least a portion of a set of commands;

determining, using an artificial intelligence algorithm and based on the input and based on historical data that includes previously input commands, one or more predicted sets of commands;

receiving, via the user interface, a user selection of a set of predicted commands from the one or more predicted sets of commands to create a user selected set of commands;

determining, by the software application, a plurality of databases affected by the user selected set of commands;

determining, by the software application, a plurality of database vendors associated with the plurality of databases;

converting the user selected set of commands into a plurality of database specific commands comprising at least first database specific commands and second database specific commands; and sending the first database specific commands to a first database of the plurality of databases, wherein the first database and the first database specific commands are associated with a first database vendor of the plurality of database vendors; and sending the second database specific commands to a second database of the plurality of databases, wherein the second database and the second database specific commands are associated with a second database vendor that is different from the first database vendor of the plurality of database vendors.

16. The computer-implemented method of claim 15, wherein the method further comprises:

receiving first results from a first server hosting the first database after performing the first database specific commands to the first database;

converting the first results into first standardized results;

receiving second results from a second server hosting the second database after performing the second database specific commands to the second database;

converting the second results into second standardized results;

merging the first standardized results and the second standardized results to create consolidated results; and displaying the consolidated results using the user interface of the software application.

17. The computer-implemented method of claim 15, wherein the method further comprises:

initiating a health check; and displaying, via the user interface, a result of performing the health check, the result comprising a status of at least one database of the plurality of databases.

18. The computer-implemented method of claim 17, wherein the method further comprises:

initiating the health check in response to:

determining that a current time comprises a predetermined time; or determining that a request to perform the health check was received from the user interface.

19. The computer-implemented method of claim 17, wherein the health check comprises:

determining one or more logs that occurred within a specified time period;

determining one or more error messages that occurred within the specified time period;

performing, using a second artificial intelligence algorithm, an analysis of the one or more logs and the one or more error messages;

predicting, based on the analysis, one or more issues associated with at least one database of the plurality of databases;

determining, using the second artificial intelligence algorithm and based at least in part on the analysis, one or more solutions to address at least one issue of the one or more issues;

ranking the one or more solutions based at least in part on a predicted probability that each solution of the one or more solutions addresses the at least one issue to create ranked solutions; and displaying, via the user interface, at least a threshold number of the ranked solutions.

20. The computer-implemented method of claim 15, the method further comprising:

after performing the first database specific commands to the first database:

receiving a first log from the first database, the first log indicating a first status of performing the first database specific commands to the first database; and storing the first log; and after performing the second database specific commands to the second database:

receiving a second log from the second database, the second log indicating a second status of performing the second database specific commands to the second database; and storing the second log.

\* \* \* \* \*